Patented Feb. 21, 1950

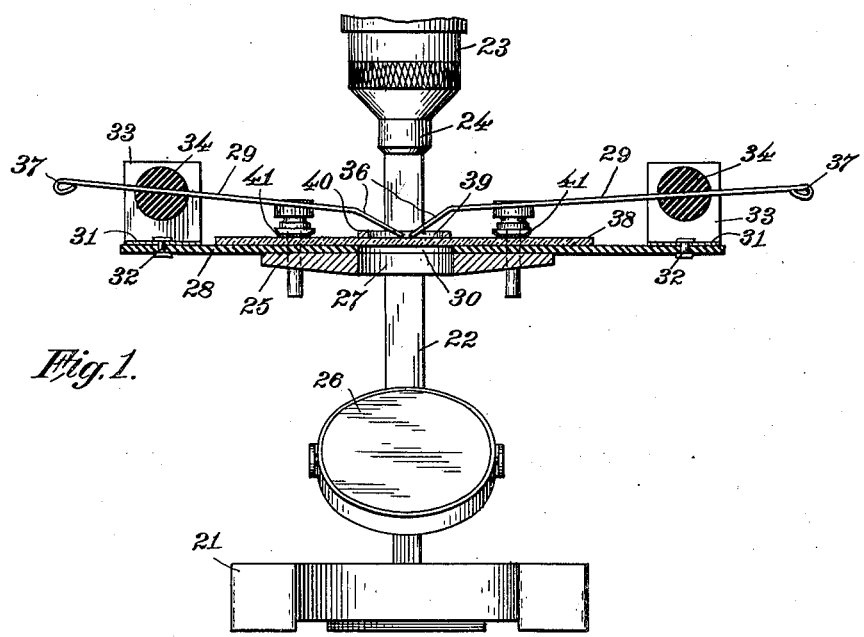
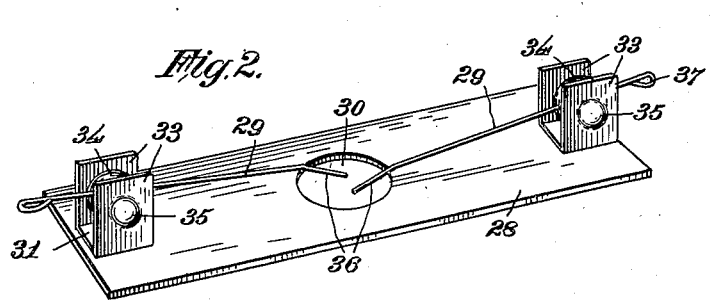
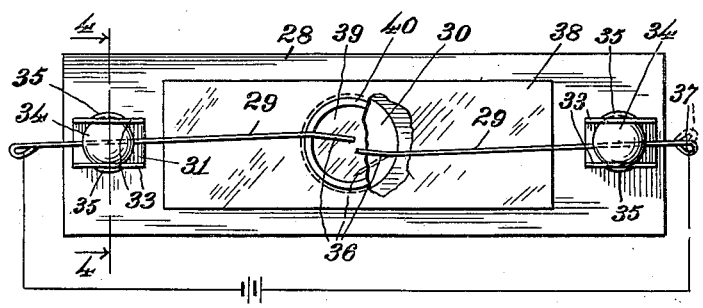
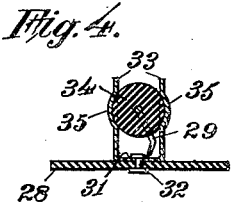

2,498,220

UNITED STATES PATENT OFFICE 2,498,220

MICROSCOPE AUXILIARY STAGE WITH ELECTRODES

Harold M. Porter, Hagerstown, Md., assignor to The Mitchel-Tyler Company, Hagerstown, Md., a corporation of Maryland Application April 17, 1946, Serial No. 662,825

4 Claims. (Cl. 88—40)

This invention relates to an auxiliary stage for microscopes, and particularly to such a device whereby the electrolytic action of an electric current on solutions, fluids and other matter may be microscopically observed.

An object of this invention is to provide an auxiliary stage adapted to rest upon the usual fixed stage of a microscope, and equipped with means for producing electrolytic action in or upon various substances within the field of observation of the instrument.

A further object of the invention is to provide an auxiliary stage as mentioned of such construction that microscope slides may be rested thereon, and the slide and auxiliary stage held in position on the fixed stage of the microscope by means of the usual slide-holding fingers with which such instruments are equipped.

A further object of the invention is to provide a device as mentioned having two electrodes which may be readily manipulated to vary the distances between the ends thereof.

A further object of the invention is to provide an auxiliary stage as mentioned which may be manufactured at low cost and which will be durable in use.

Further objects will appear hereinafter.

With these objects in view, the invention consists generally in an elongated flat strip, preferably of insulating material, a pair of electrodes consisting of wires or rods mounted for universal movement at opposite ends of said strip, with one end of each electrode extending to adjacent the center of the device, and the outer ends of the electrodes adapted for attachment to flexible conductors from a battery or other source of current supply.

The invention further consists in an appliance as above stated, in which the said strip is provided with an aperture adapted to be located directly above the usual central aperture of the fixed stage of the microscope with which it is to be used, to receive substage lighting for the subject to be observed, as by the usual mirror, or other suitable means.

The invention further consists in various details of construction and arrangements of parts, as will be fully described hereinafter and particularly pointed out in the claims.

The invention will be more readily understood by reference to the accompanying drawings, forming a part of this specification and in which:

Fig. 1 is a vertical longitudinal section of an auxiliary stage embodying my invention, and illustrated as resting upon the fixed stage of a microscope, Fig. 2 is a perspective view of the device, Fig. 3 is a plan view thereof with a slide resting thereon, a portion of the latter being broken away, and Fig. 4 is a transverse section on the line 4—4 of Fig. 3.

In Fig. 1 of the drawings I have illustrated the appliance forming the subject matter of this application in conjunction with portions of a microscope. As shown therein, the microscope includes a base 21, a limb 22, a lens barrel 23 having the objective mounting 24, a fixed stage 25, and a sub-stage mirror 26. The stage 25 is provided with the usual opening 27 directly below the objective, and above the mirror.

The auxiliary stage comprises a flat, elongated strip 28, preferably of insulating material, and a pair of electrodes 29. The strip 28 constitutes the base of the appliance and is adapted to rest directly on the upper face of the stage 25 of a microscope, and is provided with an aperture 30 to register with the opening 27 in said stage so that light from the mirror 26, or other substage lighting may illuminate the subject being observed.

Adjacent each end of the base strip 28 is a bracket in which the electrodes 29 are respectively mounted. Each of said brackets is formed of a strip of material, preferably resilient metal, which is bent to form a central portion 31 riveted or otherwise secured to the strip 28 as at 32, and a pair of upwardly extending portions or arms 33.

Each electrode 29 is formed of a single piece of wire or rod extending through a ball or spherical member 34, which is mounted between the portions 33 of its respective bracket; and said portions are provided with sockets 35 in which portions of the balls 34 rest. By this arrangement the electrodes are mounted for universal movement; and the resiliency of the arms or portions 33 is sufficient to hold the electrode in any position to which it is adjusted, and yet permit free and easy manipulation of the same.

The inner ends of the electrodes extend to adjacent the center of the device, and terminate in angularly bent portions 36 for a purpose which will appear hereinafter. The electrodes are axially rotatable and slidable in the ball mounting 34, and to facilitate such rotation or other manipulation, the outer ends of the electrodes are formed with loops 37. These loops also provide means whereby flexible conductors from a battery or other source may be readily attached thereto, as by spring clamps on the conductors, not shown, or in any other manner.

In using the device, a glass microscope slide 38 is provided for the subject to be observed, and the base 28 of the auxiliary stage is of sufficient size to amply accommodate the slide 38 between the electrode holding brackets. As the subject is usually a liquid, or of fluid consistency, the slide 38 may be provided with a well 39 preferably formed by an annular member 40 cemented to or formed upon the slide.

As hereinbefore stated, the inner ends of the electrodes are angularly disposed; and it should be noted that the pivoted point of the mounting of the electrode is considerably above the plane of the member 40. By this construction, the electrode may be manipulated so as to have only the tip thereof dip into the well, or the electrode may be turned in the ball mounting so as to submerge a larger portion of the end if desired. Also the distance between the ends of the electrodes may be varied at will, even as the electrolysis proceeds. When in use, the auxiliary stage and the superposed slide are held firmly on the stage of the microscope by the usual spring arms 41 normally forming part of the microscope equipment.

It is obvious that variations may be made in the device as above described without departing from the scope of my invention, and it is therefore to be understood that other forms or modifications may be embraced within the scope of the appended claims.

What is claimed is:

1. An auxiliary stage for microscopes comprising an elongated base of insulating material, a pair of spaced, upwardly extending arms adjacent each end of said base and having sockets in the adjacent faces thereof, a ball mounted in the sockets of each pair of arms, an electrode extending through each of said balls and axially rotatable therein, one end of each of said electrodes terminating in an angularly disposed end adjacent the center of said base, and the opposite end of each electrode extending outwardly beyond said arms and bent to facilitate manipulation of the electrode.

2. An auxiliary stage for microscopes comprising an elongated base, a bracket adjacent each end of said base, a pair of electrodes having a ball and socket connection with said brackets respectively, in combination with a micro-slide on said base, said slide having a well, and the inner ends of said electrodes terminating in ends adapted to be positioned in said well.

3. An auxiliary stage for microscopes comprising an elongated base, a bracket adjacent each end of said base, a pair of electrodes, a ball and socket mounting for said electrodes in said brackets respectively, in combination with a micro-slide on said base, said slide having a well, each of said electrodes being axially rotatable in its respective ball mounting and terminating in angularly bent ends adapted to be inserted in said well.

4. A microscope including the usual fixed stage having a central aperture, and clamping fingers associated therewith, in combination with an auxiliary stage supported on the fixed stage and comprising a base plate having an aperture registering with the aperture in the fixed stage, a pair of electrodes each having a ball and socket mounting on said base, a micro-slide on said base having a well above said apertures, each of said electrodes terminating in an end adapted to be inserted in said well, said slide and said auxiliary stage being held in position on said fixed stage by said clamping fingers.

HAROLD M. PORTER.

REFERENCES CITED

The following references are of record in the file of this patent:

UNITED STATES PATENTS

| Number | Name | Date |
|---|---|---|
| 587,138 | Roberts | July 27, 1897 |
| 628,373 | Van Denbergh | July 4, 1899 |
| 1,115,902 | Coughenour | Nov. 3, 1914 |
| 1,144,941 | Lidberg | June 29, 1915 |
| 1,198,116 | Doyle | Sept. 12, 1916 |
| 1,449,148 | Gehrig | Mar. 20, 1923 |
| 2,351,282 | Oliver | June 13, 1944 |